H. A. TURNER.
Fly-Fan Motor.
No. 205,701. Patented July 2, 1878.
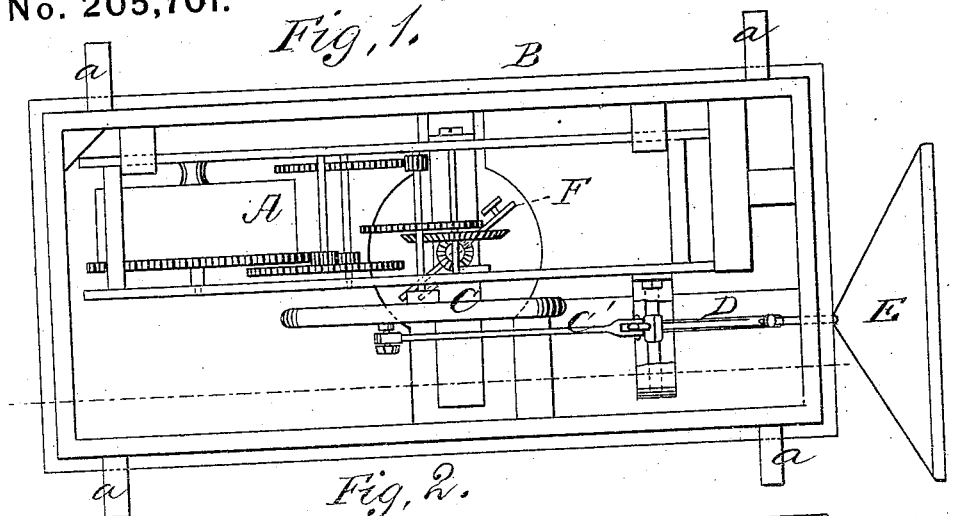
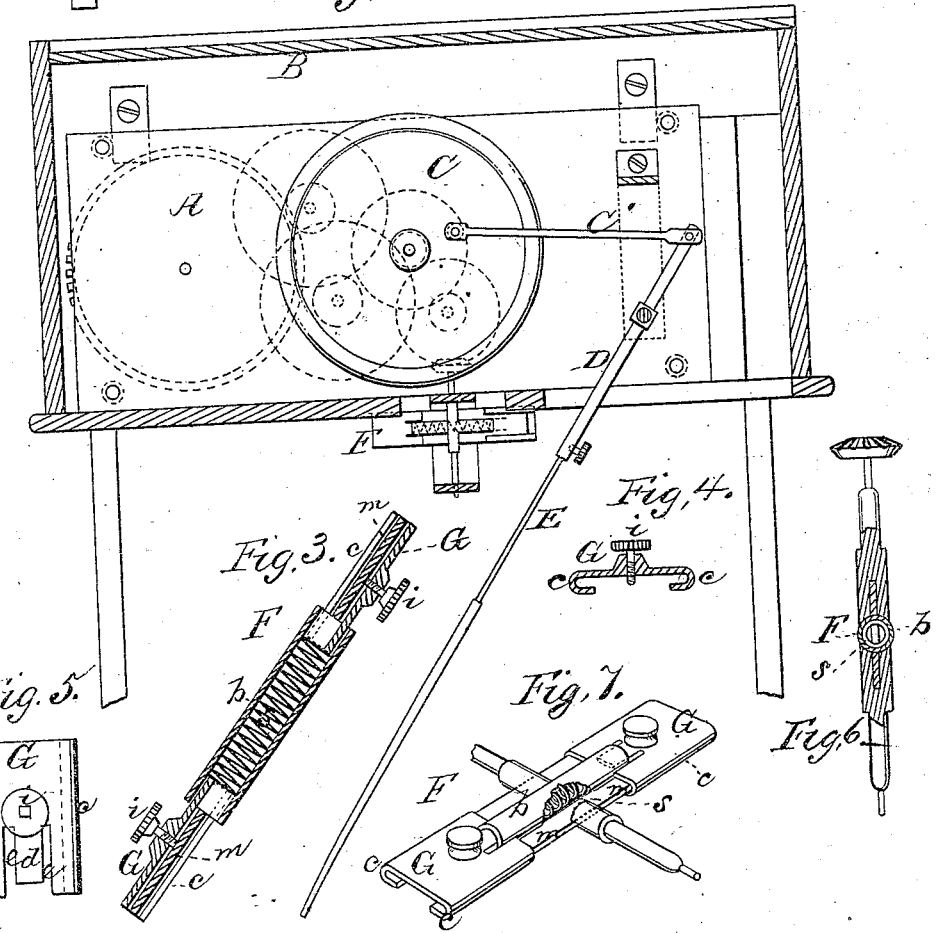
WITNESSES
Villette Anderson
F. J. Mase
INVENTOR
Hardaway A. Turner
by E. W. Anderson
ATTORNEY

UNITED STATES PATENT OFFICE.

HARDAWAY A. TURNER, OF BEDFORD COUNTY, VIRGINIA.

IMPROVEMENT IN FLY-FAN MOTORS.

Specification forming part of Letters Patent No. 205,701, dated July 2, 1878; application filed June 15, 1878.

*To all whom it may concern:*

Be it known that I, HARDAWAY AMBROSE TURNER, of the county of Bedford and State of Virginia, have invented a new and valuable Improvement in Fly-Fan Motors; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top view of my improved fly-fan. Fig. 2 is a longitudinal vertical section thereof, and Figs. 3, 4, 5, 6, and 7 are detail views of the fly.

This invention has relation to improvements in clock-train motors for fly-fans and other mechanisms wherein it is desirable to regulate the speed attained thereby.

The nature of the invention consists in combining, with a clock mechanism actuating a fly-fan or other device, a fly having a sheathed spring in the length thereof, extension-wings on the blades of the fly having tangs entering said sheath at opposite ends, and bearing on said spring, and a set-screw extending through the wings and bearing against the blades of the said fly, whereby the beating-surface of the blades may be increased or diminished, as will be hereinafter more fully set forth.

In the annexed drawings, the letter A designates a clock-movement arranged within a casing, B, supported on legs $a$. This train imparts rotary motion to a crank-wheel, C, connected by a pitman, C', to a vertically-vibrating arm, D, that carries the fan E, and the motion of the latter is rendered regular by a fly, F. This fly is provided with a longitudinal sheath, $b$, in which is a coiled spring, $s$, and is open at both ends. The wings G are provided upon their lateral edges with guideways $c$, between which are snugly received the fly-blades $m$. These wings are each provided at their inner ends with a tang, $d$, formed by cutting two slits, $e$, therein, that is received in the open end of the sheath $b$ when the said wings are engaged with the guides $c$, and bear against the end of the said spring. By placing the thumb and forefinger on the ends of the wings and forcing them toward each other the spring $s$ will yield and allow the said wings to telescope with the blades of the fly, and thus reduce the air-beating surface thereof. The adjustment thus obtained is secured by setting up the screws $i$ that pass through a screw-threaded perforation in each wing and bear against the blade of the fly. To increase the beating-surface of the fly, loosen screws $i$ sufficiently to allow spring $s$ to react slowly and extend the said wings, and, the desired adjustment being obtained, then reapply the said screws.

It will be evident from the above description that all unnecessary handling of the fly is done away with, the spring $s$ serving to extend the wings when necessary, while the fingers are utilized in manipulating the screws.

What I claim as new, and desire to secure by Letters Patent, is—

The combination, with a fly-fan and its operating clock-train, of a fly, F, having a sheath, $b$, a spiral spirng, $s$, in said sheath, and the wings G, having lateral guideways $c$, a tang, $d$, adapted to enter the sheath, and an adjusting-screw, $i$, arranged and operating substantially as set forth.

In testimony that I claim the above I have hereunto subscribed my name in the presence of two witnesses.

H. A. TURNER.

Witnesses:
WALTER C. MASI.
EMORY H. BATES.